US011099926B2

(12) United States Patent
Callison et al.

(10) Patent No.: US 11,099,926 B2
(45) Date of Patent: Aug. 24, 2021

(54) SENSOR READING VERIFICATION AND QUERY RATE ADJUSTMENT BASED ON READINGS FROM ASSOCIATED SENSORS

(71) Applicant: HEWLETT PACKARD ENTERPRISE DEVELOPMENT LP, Houston, TX (US)

(72) Inventors: Rachel Callison, Roseville, CA (US); Robert Brodeur, Roseville, CA (US); Robert Tappan, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 168 days.

(21) Appl. No.: 16/383,740

(22) Filed: Apr. 15, 2019

(65) Prior Publication Data
US 2020/0327009 A1 Oct. 15, 2020

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/3089* (2013.01); *G06F 16/1734* (2019.01);
(Continued)

(58) Field of Classification Search
CPC ............. G06F 11/0793; G06F 11/3058; G06F 11/3089
See application file for complete search history.

(56) References Cited

U.S. PATENT DOCUMENTS

| 6,687,637 B2 * | 2/2004 | Garabedian | G05B 9/02 |
| | | | 342/41 |
| 7,096,159 B2 * | 8/2006 | Cataltepe | G05B 17/02 |
| | | | 700/110 |

(Continued)

FOREIGN PATENT DOCUMENTS

CN 108363369 A 8/2018

OTHER PUBLICATIONS

Diego Garcia et al., "Sensor Data Validation and Reconstruction in Water Networks: a Methodology and Software Implementation," Sep. 10, 2014, pp. 1-12.
(Continued)

*Primary Examiner* — Elmira Mehrmanesh
(74) *Attorney, Agent, or Firm* — Hewlett Packard Enterprise Patent Department

(57) ABSTRACT

Systems and methods described herein leverage dependence relationships between sensor readings to facilitate rapid detection of erroneous sensor readings and rapid response times when accurate sensor readings indicate events that call for remedial action. When a target sensor reports a questionable sensor reading, systems described herein can query additional sensors whose readings share expected dependence relationships with readings from the target sensor. Systems described herein determine whether the questionable sensor reading is trustworthy based on the expected dependence relationships and additional sensor readings received from the additional sensors. If the questionable sensor reading is trustworthy, the system can trigger appropriate remedial action and increase query rates for the additional sensors (and the target sensor) to monitor an underlying event more closely. If the questionable reading is not trustworthy, the system can trigger appropriate remedial (Continued)

action (e.g., by deactivating the sensor or sending an alert to an administrator).

19 Claims, 5 Drawing Sheets

(51) Int. Cl.
    *G06F 11/30*     (2006.01)
    *G06F 16/17*     (2019.01)
    *H04Q 9/02*     (2006.01)
    *G06F 16/2458*     (2019.01)

(52) U.S. Cl.
    CPC .......... *G06F 16/2458* (2019.01); *H04Q 9/02* (2013.01); *H04Q 2209/47* (2013.01)

(56) References Cited

U.S. PATENT DOCUMENTS

| | | |
|---|---|---|
| 9,103,805 B2 | 8/2015 | Gettings et al. |
| 9,297,748 B2 | 3/2016 | Risk et al. |
| 9,719,866 B2 * | 8/2017 | Kobayashi ............. G01K 1/026 |
| 10,114,987 B2 | 10/2018 | Nikunen et al. |
| 10,152,336 B2 * | 12/2018 | Kohlenberg ........ G06F 11/0772 |
| 10,419,152 B2 * | 9/2019 | Hanneman, Jr. .... H04J 14/0283 |
| 10,499,124 B1 * | 12/2019 | Natanzon ............... H04L 41/065 |
| 10,568,238 B1 * | 2/2020 | Leung ..................... G06F 1/185 |
| 2012/0116724 A1 * | 5/2012 | Takara ................... H04L 67/12 702/188 |
| 2018/0003572 A1 * | 1/2018 | Garsd ...................... G01K 3/14 |
| 2018/0306729 A1 * | 10/2018 | Harrison ............ G01N 21/0303 |

OTHER PUBLICATIONS

MJRobot, "IoT Made Simple: Monitoring Multiple Sensors," Aug. 25, 2017, pp. 1-4 (online), Retrieved from the Internet on Jan. 15, 2019 at URL: <hackster.io/mjrobot/iot-made-simple-monitoring-multiple-sensors-db887f>.

Po-Yu Chen et al., "Distributed Real-time Anomaly Detection in Networked Industrial Sensing Systems," Jun. 6, 2014, pp. 1-10, IEEE.

* cited by examiner

SENSOR READING VERIFICATION AND QUERY RATE ADJUSTMENT BASED ON READINGS FROM ASSOCIATED SENSORS

RELATED APPLICATIONS

This application is related to U.S. patent application Ser. No. 16/131,002 ("Dynamic Adjustment of Sensor Query Rates Based on Sensor Readings"), filed on Sep. 13, 2018.

BACKGROUND

Sensors can collect information about current levels of certain properties where the sensors are located. When in communication with a computing system via a network, such sensors allow those properties to be monitored on a large scale with relatively low latency. There are many different types of sensors and systems into which those sensors can be incorporated. For example, voltage sensors and amperage sensors are primarily used to measure different types of loads on electrical systems. Smoke detectors, motion sensors, moisture sensors, and carbon monoxide detectors are often used to measure ambient conditions in home and business environments. Systems can leverage large groups of sensors connected to the Internet of Things (IoT) to collect measurements and report those measurements to a central network location for consolidation and storage. System administrators can use various software tools to visualize and analyze the measurement data.

BRIEF DESCRIPTION OF THE DRAWINGS

Various features and advantages will become apparent from the following description, given by way of example only, which is made with reference to the accompanying drawings, of which.

DETAILED DESCRIPTION

Figure 1:
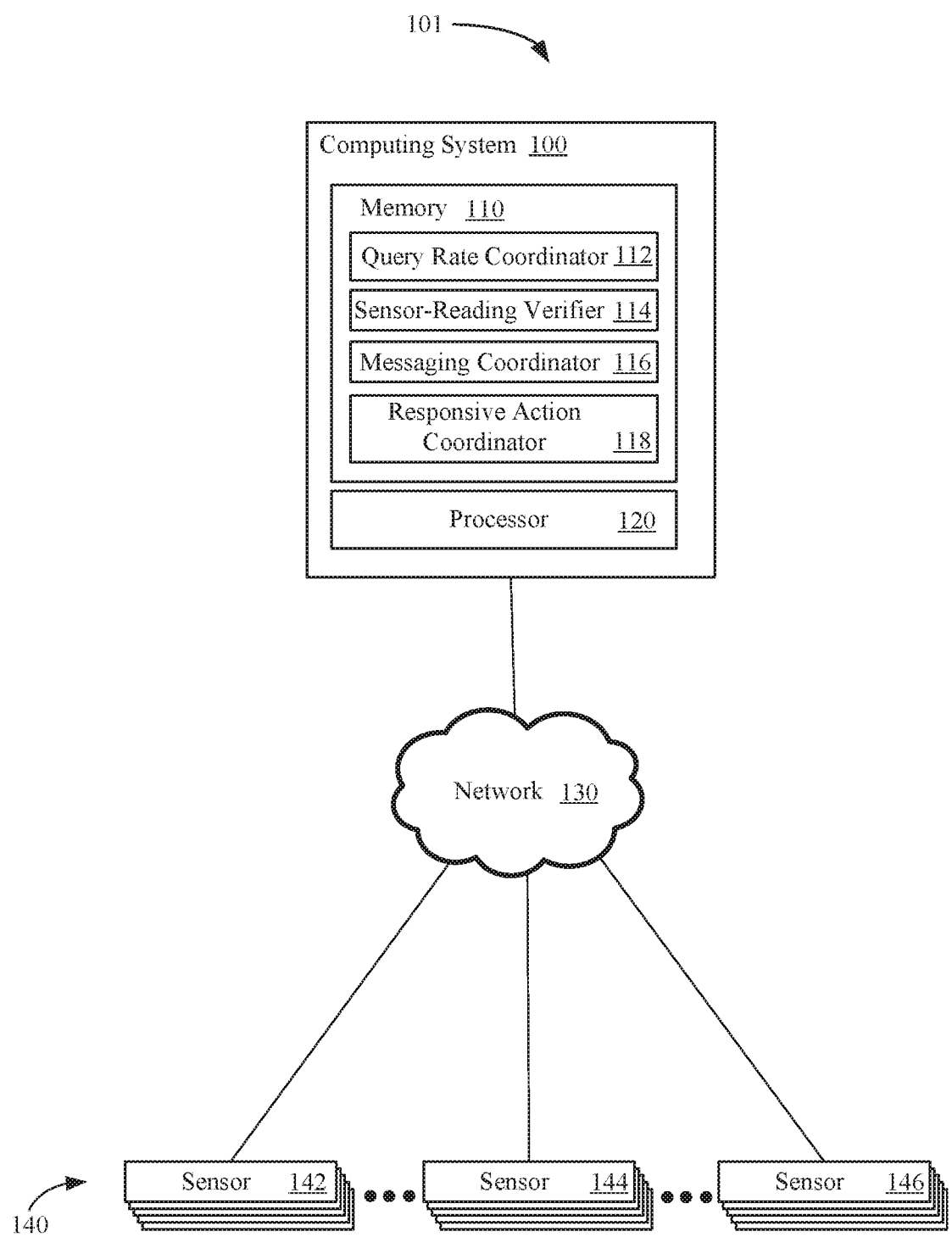
FIG. 1 illustrates an example computing environment in which systems described herein can operate.

Some types of modern systems (e.g., server farms, IoT systems, or other types of systems) may include multiple sensors distributed across an area of interest. Such sensors may be configured to transmit sensor readings to a network computing destination where processors, memory, and storage are available for collecting and analyzing the sensor-reading data.

In a system in which many sensors are deployed, the likelihood that at least a few sensors will malfunction is high. Many types of sensors contain sensitive electronic components that can corrode, break, or otherwise degrade over time due to environmental conditions such as heat, humidity, vibration, sunlight, and salinity. Malfunctioning sensors may report inaccurate sensor readings periodically at first, but then with increased frequency over time. In big-data applications that involve large numbers of sensor readings, it may take a considerable amount of time and processing to detect and discard these inaccurate sensor readings.

Depending on the composition of a sensor network, the nature of the computing system with which the sensors communicate, and other factors, sensor failures can result in consequences that range from benign to catastrophic. For example, if one water-level sensor in a dense deployment of water-level sensors in a rice paddy reports a wildly inaccurate reading, a horticultural researcher using statistical software to study the distribution of readings from all the water-level sensors over time might easily notice that the inaccurate reading is an outlier. However, if a sensor in a proximity fuse (e.g., a radio sensor, an optical sensor, an acoustic sensor, a magnetic sensor, or a pressure sensor) of a missile malfunctions, the missile could detonate at an unexpected time.

In some scenarios, inaccurate sensor readings can mask serious problems that could have been detected but for the inaccuracy of the readings. For example, if the actual temperature within a chassis for a server is much higher than reported by a thermal sensor within the chassis, various components within the server (e.g., a processor) may fail unexpectedly. Such a failure may lead to monetary costs (e.g., the cost of replacement components and the cost of a server technician's time) and other costs, such as server downtime resulting in a reduced quality of experience (QoE) for an important customer. It may be clear that the sensor malfunctioned after the fact, but the costs could have been avoided if the sensor readings could have been flagged as untrustworthy before the component failure.

In other scenarios, inaccurate sensor readings can trigger false alarms that elicit costly responses. For example, if a motion detector erroneously reports that movement has been detected in a bank vault in the middle of the night, security personnel and police may scramble to the vault to thwart a supposed robbery that is not actually occurring. The police response to the false alarm may cause a delayed response to actual imminent emergencies in which minutes—or even seconds—may count. Furthermore, if several false alarms happen within a short time period, a boy-who-cried-wolf effect may cause police and security personnel to hesitate to respond to future true alarms triggered by sensors. Again, it may be clear that the sensor malfunctioned after the fact, but the consequences caused by the false alarms could have been avoided if the sensor readings had been flagged as untrustworthy before the police and the security personnel responded.

Thus, in some contexts, rapid identification of inaccurate sensor readings can prevent costly responses to false alarms and prevent true problems from going undetected.

Depending on the types of sensors used in a system and the density with which those sensors are deployed, a dependence relationship may exist between the readings measured by some sensors. For example, readings measured by two temperature sensors (e.g., thermistors, thermocouples, or resistance temperature detectors (RTDs)) that are positioned on neighboring transceiver (XCVR) interfaces will generally be positively correlated because as the temperature of one of the transceiver interfaces increases, the temperature of the neighboring interface will also increase. Similarly, sensor readings measured by several barometers that are positioned outdoors within several hundred yards of each other will also tend to be positively correlated.

Dependence relationships may also exist between sensors of different types. For example, readings measured by an amperage sensor coupled to an electrical cable may be correlated with readings measured by a thermal sensor that is coupled to a different section of the same electrical cable because the temperature of the cable is likely to increase as the electrical current through the cable increases. The readings of the thermal sensor may also be negatively correlated with readings from a wind sensor that is positioned close enough to the cable to be affected by weather patterns surrounding the cable because high winds may cool the cable. Note, however, that dependence relationships between sensor readings may not be transitive in some cases. For example, although readings from both the wind sensor and the amperage sensor are correlated with readings from the thermal sensor, the readings from the wind sensor might not be correlated with the readings from the amperage sensor.

In some systems, two sensors whose readings are related via a dependence relationship may be queried at different times or at different rates (e.g., to coordinate use of a shared system bus). As a result, a trend may be detectable in sensor readings from a first sensor before a correlated trend is detectable in sensor readings from a second sensor whose readings share a dependence relationship with the readings from the first sensor.

However, in some scenarios, the trends in the readings from both sensors may originate from an underlying physical condition that is more closely tied to the second sensor than to the first sensor even though the trend in the first sensor's data is detectable sooner. For example, suppose the first sensor is thermal sensor adjacent to a first transceiver and the second sensor is a thermal sensor adjacent to a second transceiver neighboring the first transceiver. Also suppose that a server queries both the first sensor and the second sensor for readings at the same rate (e.g., once every thirty seconds), but that the server alternates between the first sensor and the second sensor in a round-robin fashion (e.g., by querying the first sensor, querying the second sensor fifteen seconds later, querying the first sensor again fifteen seconds after querying the second sensor, and so forth). If the temperature of the second transceiver increases suddenly immediately after the server queries the second sensor, heat from the second transceiver may cause the temperature of the first transceiver to increase noticeably by the time the server queries the first sensor. However, the server will not be apprised that the temperature of the second transceiver has increased until the server queries the second sensor again. Hence, although the underlying condition causing the readings from both sensors to increase originates from the second transceiver, the trend of the increasing temperature may be detectable in a reading from the first sensor. Since the temperature of the first transceiver may increase more slowly than the temperature of the second transceiver, the severity and urgency of the underlying condition may not be fully appreciated until the server queries the second sensor. The resulting delay may cause remedial action to be triggered too late to prevent the second transceiver from being damaged by the elevated temperature.

Systems and methods described herein leverage dependence relationships between sensor readings to address the problems discussed above. Specifically, systems and methods described herein facilitate rapid detection of erroneous sensor readings and rapid response times when accurate sensor readings indicate events that call for remedial action. When a target sensor reports a questionable sensor reading, systems described herein can query additional sensors whose readings share dependence relationships with readings from the target sensor. Systems described herein compare the readings reported by the additional sensors to the questionable sensor reading and determine whether the questionable sensor reading is trustworthy based on the dependence relationships. If the questionable sensor reading is trustworthy, the system can trigger appropriate remedial action and increase query rates for the additional sensors (and the target sensor) to monitor an underlying event more closely. If the questionable reading is not trustworthy, the system can trigger appropriate remedial action (e.g., by deactivating the sensor or sending an alert to an administrator) and increase the query rates for the additional sensors to compensate for the unreliability of the target sensor.

FIG. 1 illustrates an example computing environment 101 in which systems described herein can operate. As shown, the computing environment 101 may include a computing system 100. Sensors 140 communicate with the computing system 100 via a network 130 (e.g., the Internet, a local area network (LAN), or some other type of network). The sensors 140 comprise sensor 142, sensor 144, and sensor 146, which are shown to facilitate an explanation of how systems described herein may operate. However, persons of skill in the art will understand that the systems described herein may use more sensors (e.g., hundreds, thousands, or more) or fewer sensors (e.g., as few as two) without departing from the spirit and scope of this disclosure.

The sensors 140 are configured to take sensor readings that measure a property of interest over time and report those sensor readings (e.g., individually or in batches) to the computing system 100 via the network 130 in response to queries. (Note that, in some examples, the sensors 140 may also be configured to report the sensor readings automatically at a predefined frequency without waiting for queries). In various embodiments, different types of sensors may be used. For example, the sensors 140 may be thermal (e.g., temperature) sensors, voltage sensors, current (e.g., amperage) sensors, motion sensors, light sensors, pressure sensors, infrared sensors, audio sensors (e.g., microphones), or other types of sensors. In some embodiments, the sensors 140 may be part of an Internet-of-Things (IoT) system.

The specific type of sensor used in any particular embodiment will depend on the objectives that embodiment is designed to achieve. In one example, the sensors 140 may be thermal sensors that monitor the temperatures of electronic components (e.g., processors in a server cluster, the optical transceivers in a network switch, etc.) so that excessive temperatures can be detected and a responsive action (e.g., increasing fan speeds or shutting down components with temperatures that exceed a threshold) can be triggered. In another example, the sensors 140 may be moisture sensors that monitor water levels in soil so that sub-optimal moisture levels can be detected and a responsive action (e.g., activating a garden sprinkler system) can be taken. In other examples, the sensors 140 may include sensors of more than one type (e.g., sensor 142 could be a temperature sensor, sensor 144 could be an amperage sensor, and sensor 146 could be a wind sensor). These examples are merely illustrative. Persons of skill in the art will recognize that many other types of sensors may be used in other examples to monitor other quantitative properties of interest.

The computing system includes a processor 120 and memory 110 (e.g., random access memory, a cache, etc.). The processor 120 executes a query rate coordinator 112 that is stored in the memory 110. The query rate coordinator 112 can dynamically determine the rates at which sensor readings will be collected from each of the sensors 140. The query rate coordinator 112 can apply various methodologies to determine the rates. Some of these methodologies are described in U.S. patent application Ser. No. 16/131,002 ("Dynamic Adjustment of Sensor Query Rates Based on Sensor Readings"), which is hereby incorporated by reference.

The processor 120 also executes the messaging coordinator 116. The messaging coordinator 116 queries the sensors 140 for sensor readings at the query rates determined by the query rate coordinator 112. In response, the sensors 140 send the requested readings to the messaging coordinator 116.

The processor 120 also executes a sensor-reading verifier 114. The sensor-reading verifier 114 analyzes sensor readings received from the sensors 142 for anomalies. When analyzing a specific sensor reading (referred to herein as a "target sensor reading" because it is the reading currently being analyzed), the sensor-reading verifier 114 first determines whether the target sensor reading satisfies one or more predefined conditions. If at least one of the predefined conditions is satisfied, the sensor-reading verifier 114 can flag the target sensor reading as potentially inaccurate and initiate a more thorough analysis to determine whether the target sensor reading is trustworthy.

There are many different types of predefined conditions that the sensor-reading verifier 114 can use. For example, if the reading is received from the sensor 142, the sensor-reading verifier 114 may compare the reading to a prior reading from the sensor 142 that was taken by the sensor 142 (referred to as the "target sensor" in this example because it is the sensor at which the target sensor reading was measured). One predefined condition the sensor-reading verifier 114 may check is whether the magnitude of the numerical difference between the target sensor reading and the prior sensor reading exceeds a predefined threshold.

Another predefined condition the sensor-reading verifier 114 may evaluate is whether a magnitude of a rate of change (e.g., a first derivative or a second derivative) of a least-squares regression curve or an interpolation curve (e.g., a Lagrange polynomial or a cubic spline) defined using the target sensor reading and the prior sensor reading (and, in some examples, additional prior sensor readings from the sensor 142) plotted against time exceeds a predefined threshold at any point between the time when the prior sensor reading was measured and the time when the target sensor reading was measured.

Another predefined condition the sensor-reading verifier 114 may evaluate is whether the magnitude of the target sensor reading falls outside a predefined range of possible values for the type of the sensor 142. For example, if the sensor 142 is a temperature sensor and the target reading is less than absolute zero (i.e., negative 273.15 degrees Celsius) or greater than the melting point of tungsten (i.e., 3,414 degrees Celsius), the target sensor reading is most likely inaccurate. Persons of skill in the art will recognize that many other predefined conditions may be used.

If the sensor-reading verifier 114 determines that at least one predefined condition is satisfied, the sensor-reading verifier 114 can trigger an action to verify whether the target sensor reading is accurate. Specifically, the sensor-reading verifier 114 can signal the messaging coordinator 116 (which may also be executed by the processor 120) to query at least one additional sensor (e.g., sensor 144 or sensor 146) that is associated with the target sensor (e.g., sensor 142) immediately via the network 130 for at least one additional sensor reading. In this context, the association between the target sensor and the additional sensor(s) queried implies a dependence relationship such that sensor readings measured by the target sensor are, statistically speaking, not independent of sensor readings measured by the additional sensor(s). More formally, if T represents the target sensor reading, t represents one possible value of the target sensor reading, A represents an additional sensor reading, and a represents one possible value of the additional sensor reading, then:

$$\exists a: P(T=t|A=a) \neq P(T=t) \cdot P(A=a)$$

Many types of dependence relationships can exist between readings measured by two sensors that are thus associated. Some of those dependence relationships may be established a priori. For example, if two sensors of the same type (e.g., temperature sensors) are known to be located within a predefined distance (e.g., one inch) of each other, a positive correlation may be expected between the readings of those two sensors.

Other types of dependence relationships may be more difficult to identify, yet still be useful for the sensor-reading verifier 114 to use for evaluating whether a target sensor reading is trustworthy. In some cases, the sensor-reading verifier 114 or some other module in the computing system 100 may discover dependence relationships empirically using data reported from the sensors 140. For example, the sensor-reading verifier 114 may compare a set of sensor readings measured by the sensor 142 to a set of sensor readings measured by the sensor 144 over the same time period to determine whether a dependence relationship exists as reflected by the Pearson correlation coefficient between the two sets. The Pearson correlation coefficient may indicate a positive correlation or a negative correlation; both types of correlations are dependence relationships.

In another example, the sensor-reading verifier 114 may discover dependence relationships in the following manner. First, the sensor-reading verifier 114 can create a corpus of training instances for a machine-learning model. The corpus of training instances corresponds to the target sensor for which dependence relationships are to be discovered. Each training instance can comprise a feature set and a label. The label of a training instance can be a sensor reading measured by the target sensor (e.g., sensor 142) at a particular time, while the features of the training instance can be sensor readings measured by additional sensors (e.g., the other sensors included in the sensors 140 or a subset thereof, such as sensor 144 and sensor 146) at or near the time at which the target sensor reading was measured.

For example, suppose a sensor reading measured by the target sensor at time x is 1.77 units (e.g., degrees Celsius, Coulombs, ohms, etc.). Also suppose that an additional sensor reading measured by a first additional sensor (e.g., sensor 144) during the time interval between x−∂ and x+∂ is 2.0 units (where ∂ is a predefined number). Also suppose that an additional sensor reading measured by a second additional sensor (e.g., sensor 146) during the time interval between x−∂ and x+∂ is 1.3 units. A training instance for the sensor reading measured by the target sensor at time x could be {2.0, 1.3, 1.77}, where 1.77 is the label and 2.0 and 1.3 are the features of the training instance. Note that more or fewer features may be used, but each feature maps to a single additional sensor—namely, the additional sensor that measured the sensor reading that serves as the feature. In some examples, multiple features may map to a single additional sensor (e.g., if an additional sensor takes more than one sensor reading during the time interval between x−∂ and x+∂). Each label maps to the target sensor for which dependence relationships are to be discovered. The corpus of training instances may be stored in attribute-relation file format (ARFF) or in some other format used to store training data for machine-learning models.

Once the corpus of training instances is generated, the sensor-reading verifier 114 can apply one or more feature-selection techniques to identify which features meet a threshold level of correlation with the labels. In this context, features that meet the threshold level of correlation are referred to as "selected" features. Some feature-selection techniques that can be applied include the Las Vegas Filter (LVF), Las Vegas Incremental (LVI), Relief, Sequential Forward Generation (SFG), Sequential Backward Generation (SBG), Sequential Floating Forward Search (SFFS), Focus, Branch and Bound (B & B), and Quick Branch and Bound (QB&B) techniques. Persons of skill in the art will recognize that this list of feature-selection techniques is not exhaustive and that many other types of feature-selection techniques not explicitly listed here can be applied.

The sensor-reading verifier 114 identifies each additional sensor to which at least one selected feature maps as being associated with the target sensor. The sensor-reading verifier 114 can record which sensors are associated with the target sensor in a data structure (e.g., an associative array). The sensor-reading verifier 114 can use the data structure to look up which additional sensors to query when a target reading from a target sensor satisfies at least one predefined condition for triggering an action to verify whether the target sensor reading is accurate.

In addition, the sensor-reading verifier 114 can train a machine-learning model to predict labels (e.g., sensor readings for the target sensor) based on the selected features using the corpus of training data. In general, the machine-learning model is less likely to suffer from overfitting if the number of selected features is small relative to the total number of training instances in the corpus (e.g., the number of selected features should generally be at least two orders of magnitude smaller than the number of training instances in the corpus). There are many different types of inductive and transductive machine-learning models that can be used. Some examples of machine-learning models include adsorption models, neural networks, support vector machines, radial basis functions, Bayesian belief networks, association-rule models, decision trees, instance-based models (e.g., k-NN), regression models, Hopfield networks, deep belief networks, and Q-learning models.

As explained above, when the target sensor reading satisfies at least one of the predefined conditions checked by the sensor-reading verifier 114, the sensor-reading verifier 114 can signal the messaging coordinator 116 to query the additional sensors (e.g., sensor 144 and/or sensor 146) that are associated with the target sensor (e.g., sensor 142) immediately via the network 130 for additional sensor readings. Upon receiving the additional sensor reading(s) from the additional sensor(s) via the network 130, the sensor-reading verifier 114 determines a trustworthiness value for the target sensor based on the additional sensor reading(s) and the dependence relationship(s). The trustworthiness value indicates a degree to which an observed relationship between the target sensor reading and the additional sensor reading(s) matches the dependence relationship(s).

In one example, suppose sensor 142 and sensor 144 are temperature sensors that are coupled to two adjacent transceivers, respectively. Also suppose that a target sensor reading is measured at the sensor 142 at a time x and an additional sensor reading is measured during the time interval between x−∂ and x+∂. Also suppose that an expected dependence relationship dictates that the magnitude of the difference between concurrent sensor readings measured by sensor 142 and sensor 144 follows a Gaussian distribution. The sensor-reading verifier 114 may determine the magnitude of the difference between the target sensor reading and the additional sensor reading. Next, the sensor-reading verifier 114 may determine the trustworthiness value by comparing the magnitude of the difference to the Gaussian distribution. For example, the trustworthiness value may be the probability of observing the magnitude of the difference value (referred to in statistics as a p-value) in a sample of size 1 randomly selected from the Gaussian distribution. A small p-value (e.g., below a predefined threshold, such as 0.05 or 0.01) would indicate that the magnitude of the difference is very unlikely given the Gaussian distribution and, therefore, that the degree to which the observed relationship between the target sensor reading and the additional sensor reading matches the expected dependence relationship is unacceptably low. By contrast, a large p-value (e.g., above the predefined threshold) would indicate that the magnitude of the difference is acceptably likely given the Gaussian distribution and, therefore, that the degree to which the observed relationship between the target sensor reading and the additional sensor reading matches the expected dependence relationship is acceptably high.

In another example, suppose that sensor 142 is a temperature sensor, sensor 144 is an amperage sensor, and sensor 146 is a wind sensor. Also suppose that sensor-reading verifier 114 has trained a machine-learning model to predict readings from sensor 142 using readings from the sensor 144 and readings from sensor 146 (e.g., as explained above). To determine the trustworthiness value of a target sensor reading measured by the temperature sensor at a time x, the sensor-reading verifier 114 may input additional sensor readings measured by sensor 144 and sensor 146 during the time interval between x−∂ and x+∂. The machine-learning model produces a predicted reading based on the input. Next, the sensor-reading verifier 114 determines the magnitude of the difference between the predicted reading and the target reading. The trustworthiness value may be inversely proportional to the difference such that trustworthiness decreases as the magnitude of the difference increases.

Depending on the types of the sensors 140 and the purposes for which the sensors 140 are used, there are many other types of dependence relationships that may exist and many different ways that the sensor-reading verifier 114 may determine the trustworthiness value for a target sensor reading. Trustworthiness values may be numerical, categorical, or Boolean. Persons of skill in the art will recognize that the examples above are provided for illustrative purposes only.

Once the sensor-reading verifier 114 determines the trustworthiness value for the target sensor reading, the responsive action coordinator 118 may trigger an appropriate action in response to the trustworthiness value. For example, if the trustworthiness value indicates that the target sensor reading is inaccurate (e.g., the trustworthiness value falls below a predefined threshold or is a Boolean value of "false"), the responsive action coordinator 118 notifies that query rate coordinator 112 and requests that query rates for the sensors whose readings share a dependence relationship with readings of the target sensor be increased to compensate for the malfunctioning of the target sensor. In response, the query rate coordinator 114 can increase a rate at which the messaging coordinator 116 queries the subset of the sensors 140 whose readings share a dependence relationship with readings of the target sensor (e.g., sensors located within a predefined distance of the target sensor). Additionally or alternatively, the messaging coordinator 116 can signal the sensors to increase measurement rates at which the subset of the sensors 140 actually take sensor readings.

In another example, if the trustworthiness value indicates that the target sensor reading is inaccurate, the responsive action coordinator 118 can add an entry to an event log to reflect that the target reading is inaccurate. Furthermore, the responsive action coordinator can count the number of entries in the event log that indicate inaccurate readings reported by the target sensor. If the number of entries meets a predefined threshold, the responsive action coordinator 118 signals the messaging coordinator 116 to transmit a signal to the target sensor via the network 130 to deactivate the target sensor.

In another example, suppose the sensor 142 is a temperature sensor associated with (e.g., adjacent to, coupled to, or within a predefined distance of) a small form-factor pluggable (SFP) interface and is the target sensor. Also suppose that sensor 144 is a temperature sensor associated with a second SFP interface that is adjacent to the first SFP interface. If the trustworthiness value indicates that the target sensor reading is accurate and the target sensor reading exceeds a recommended operating temperature for an SFP optical transceiver plugged into the first SFP interface, the responsive action coordinator 118 can signal messaging coordinator 116 to transmit a request to a network switch to reroute network traffic previously designated for a first optical transceiver plugged in to the first SFP interface.

In other examples, the responsive action coordinator 118 can signal messaging coordinator 116 to request other types of remedial action when the trustworthiness value indicates the target reading is reliable. For example, if the target sensor is a temperature sensor in a server chassis, the messaging coordinator 116 can signal the server to increase the speed of a cooling fan, deactivate a port associated with the target sensor, deactivate an electrical component associated with the target sensor, or send an alert (e.g., an email or a pop-up message) to a system administrator.

Figure 2:
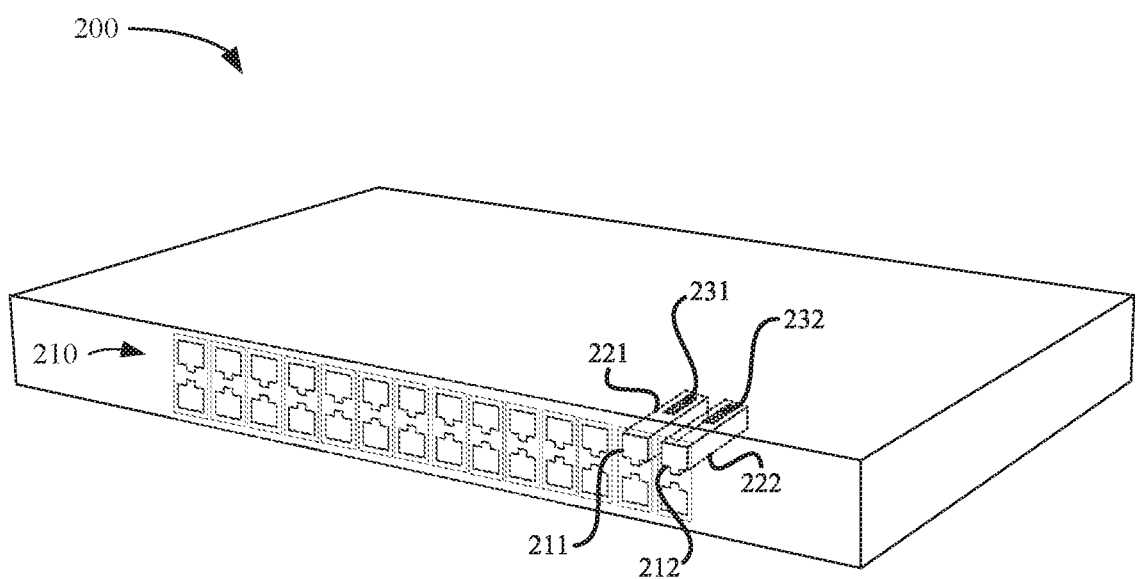
FIG. 2 illustrates a network switch that includes sensors whose sensor readings share a dependence relationship that can be leveraged by systems described herein, according to one example.

FIG. 2 illustrates a network switch 200 that includes sensors whose sensor readings share a dependence relationship that can be leveraged by systems described herein, according to one example. As shown, network switch 200 includes SFP interfaces 210. SFP optical transceiver 221 is plugged into SFP interface 211, while SFP optical transceiver 222 is plugged into SFP interface 212. Temperature sensor 231 is mounted in a position that allows the temperature sensor 231 to measure the temperature of the optical transceiver 221. For example, the temperature sensor 221 may be mounted within the SFP interface 211, alongside the SFP interface 211, on the optical transceiver 221, or within the optical transceiver 221. Similarly, temperature sensor 232 is mounted in a position that allows the temperature sensor 232 to measure the temperature of the optical transceiver 222.

A sensor-reading verifier stored in memory (e.g., at the switch 200 or at a remote network location) may be executing on a processor located in the switch 200 or at a remote network location. The temperature sensor 231 and the temperature sensor 232 may periodically transmit sensor readings (individually or in batches) to the sensor-reading verifier via a system bus or a network connection (e.g., in response to queries from the sensor-reading verifier).

When a target sensor reading reported by the temperature sensor 232 satisfies a predefined condition for triggering an action to verify whether the target sensor reading is accurate, the sensor-reading verifier transmits a query to the temperature sensor 231 for an additional sensor reading because there is an expected dependence relationship between sensor readings measured by temperature sensor 231 and sensor readings measured by temperature sensor 232. Specifically, temperature sensor 231 is associated with optical transceiver 221, which is plugged into SFP interface 211. Temperature sensor 232 is associated with optical transceiver 222, which is plugged into SFP interface 212. Since SFP interface 212 is adjacent to SFP interface 211, optical transceiver 222 is adjacent to optical transceiver 221. The close proximity of optical transceiver 222 to optical transceiver 221 causes sensor readings measured by temperature sensor 231 to be positively correlated with concurrent sensor readings measured by temperature sensor 232.

The sensor-reading verifier may be explicitly apprised of the expected dependence relationship via configuration information provided by an administrator, or the sensor-reading verifier may infer the expected dependence relationship by analyzing other available information (e.g., previous sensor readings reported by temperature sensor 231 and temperature sensor 232).

Once the sensor-reading verifier receives the additional sensor reading from the temperature sensor 231 in response to the query, the sensor-reading verifier determines a trustworthiness value for the target sensor reading based on the target sensor reading, the additional sensor reading, and the expected dependence relationship. Specifically, the sensor-reading verifier may determine an actual observed relationship between the target reading and the sensor reading and generate a trustworthiness value that reflects a degree to which the observed relationship matches the expected dependence relationship.

For example, suppose the expected dependence relationship dictates that the magnitude of the difference between a target sensor reading measured by temperature sensor 232 at time x and a sensor reading measured by temperature sensor 231 during a time interval that includes x (e.g., the time interval between x minus 10 seconds and x plus ten seconds) is 20 degrees Fahrenheit. The sensor reading evaluator may determine a difference by subtracting the additional sensor reading from the target sensor reading, square the difference, and determine the magnitude of the difference by calculating the square root of the difference squared. Next, the sensor-reading verifier may evaluate a Boolean expression to determine whether the magnitude of the difference squared is less than or equal to 20 degrees Fahrenheit. The output produced when the Boolean expression is evaluated can serve as the trustworthiness value (e.g., TRUE if the magnitude is less than 20 and FALSE otherwise).

Next, the sensor-reading verifier triggers an action in response to the trustworthiness value. For example, if the trustworthiness value indicates that the target sensor reading is acceptably trustworthy (e.g., a Boolean value of TRUE), the sensor-reading verifier can activate a system fan within the chassis of the switch 200 to cool the optical transceiver 222 (or deactivate the system fan if the target sensor reading indicates that the temperature of the optical transceiver 222 is unacceptably low). Also, the sensor-reading verifier can signal the switch 200 to reroute network traffic previously designated for the optical transceiver 222 to allow the optical transceiver 222 to cool. In another example, if the trustworthiness value indicates that the target sensor reading is not trustworthy (e.g., a Boolean value of FALSE), the sensor-reading verifier can record an entry in an error log describing the target sensor reading as an error. If the number of errors recorded in the error log for the temperature sensor 232 exceeds a predefined number, the sensor-reading verifier can signal the switch 200 to deactivate the temperature sensor 232. Also, the sensor-reading verifier can signal a query rate coordinator to query temperature sensor 231 at an increased rate to compensate for the lack of readings that will be reported by the temperature sensor 232 after deactivation.

Figure 3:
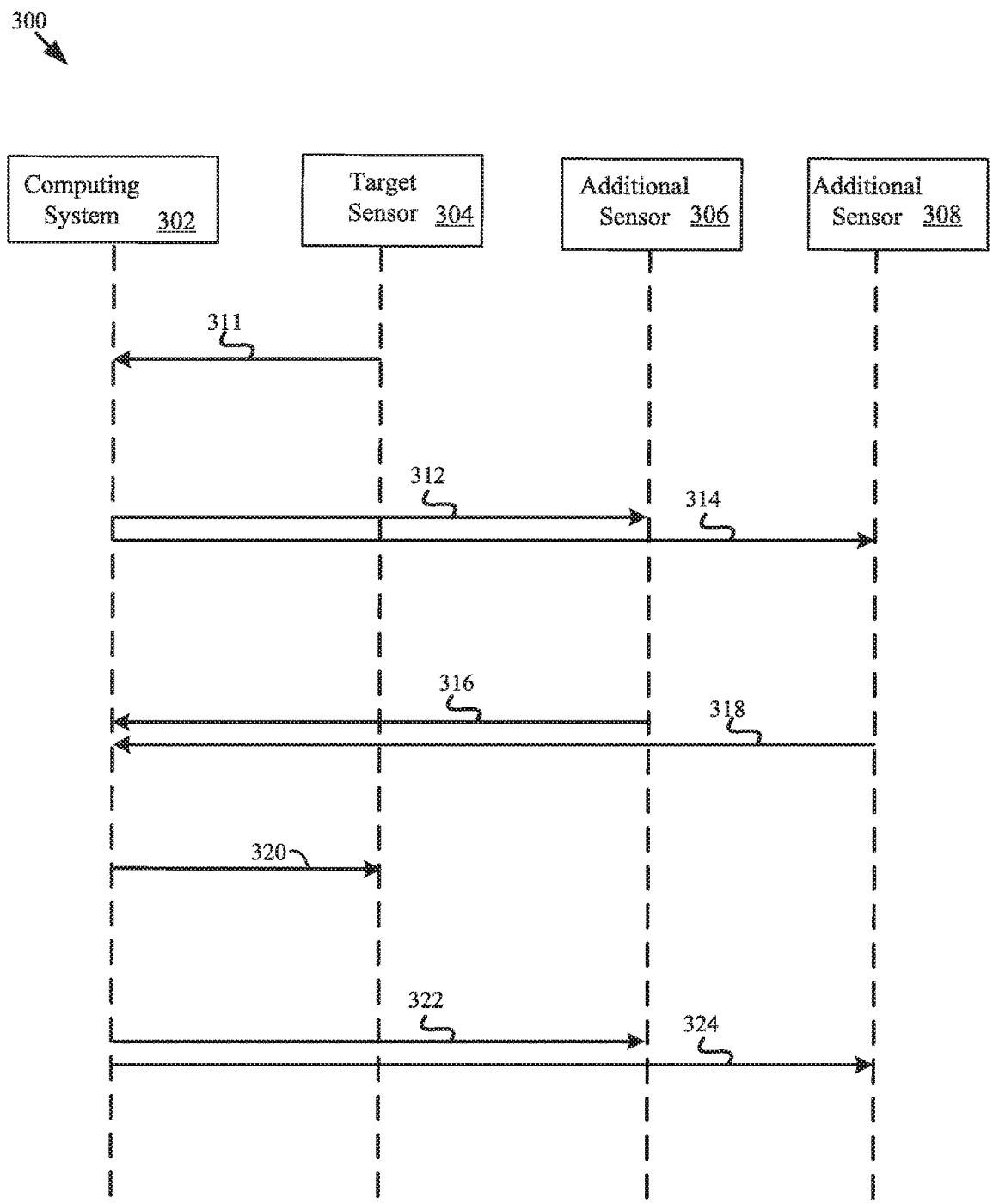
FIG. 3 illustrates a signal diagram illustrating a sequence of electronic communications between a computing system and several sensors, according to one example.

FIG. 3 illustrates a signal diagram 300 illustrating a sequence of electronic communications between a computing system 302 and several sensors, according to one example. The communications described with respect to the signal diagram 300 may be exchanged via one or more networks, system buses, or combinations thereof.

At arrow 311, the target sensor 304 reports a target sensor reading to the computing system 302. Upon determining that the target sensor reading satisfies a predefined condition, the computing system 302 queries the additional sensor 306 and the additional sensor 308 for additional sensor readings at arrow 312 and arrow 314, respectively. At arrow 316, the additional sensor 306 sends an additional sensor reading to the computing system 302 in response to the query that was sent at arrow 312. Similarly, at arrow 318, the additional sensor 308 sends an additional sensor reading to the computing system 302 in response to the query that was sent at arrow 314.

Upon receiving the additional sensor readings from the additional sensor 306 and the additional sensor 308, the computing system 302 determines a trustworthiness value for the target sensor reading based on the additional sensor readings and based on an expected dependence relationship between sensor readings measured by the target sensor 304 and the additional sensors 306, 308.

At arrow 320, upon determining that the trustworthiness value indicates that the target sensor reading is likely inaccurate, the computing system 302 sends a communication to the target sensor 304 instructing the target sensor 304 to deactivate itself (e.g., to power down, to refrain from reporting more readings to the computing system 302, or to reboot firmware executing on the target sensor.) Also, at arrow 322, the computing system 302 signals the additional sensor 306 to increase a rate at which the additional sensor 306 collects sensor readings and/or a rate at which the additional sensor 306 reports those sensor readings. Similarly, at arrow 324, the computing system 302 signals the additional sensor 308 to increase a rate at which the additional sensor 308 collects sensor readings and/or a rate at which the additional sensor 308 reports those sensor readings.

Figure 4:
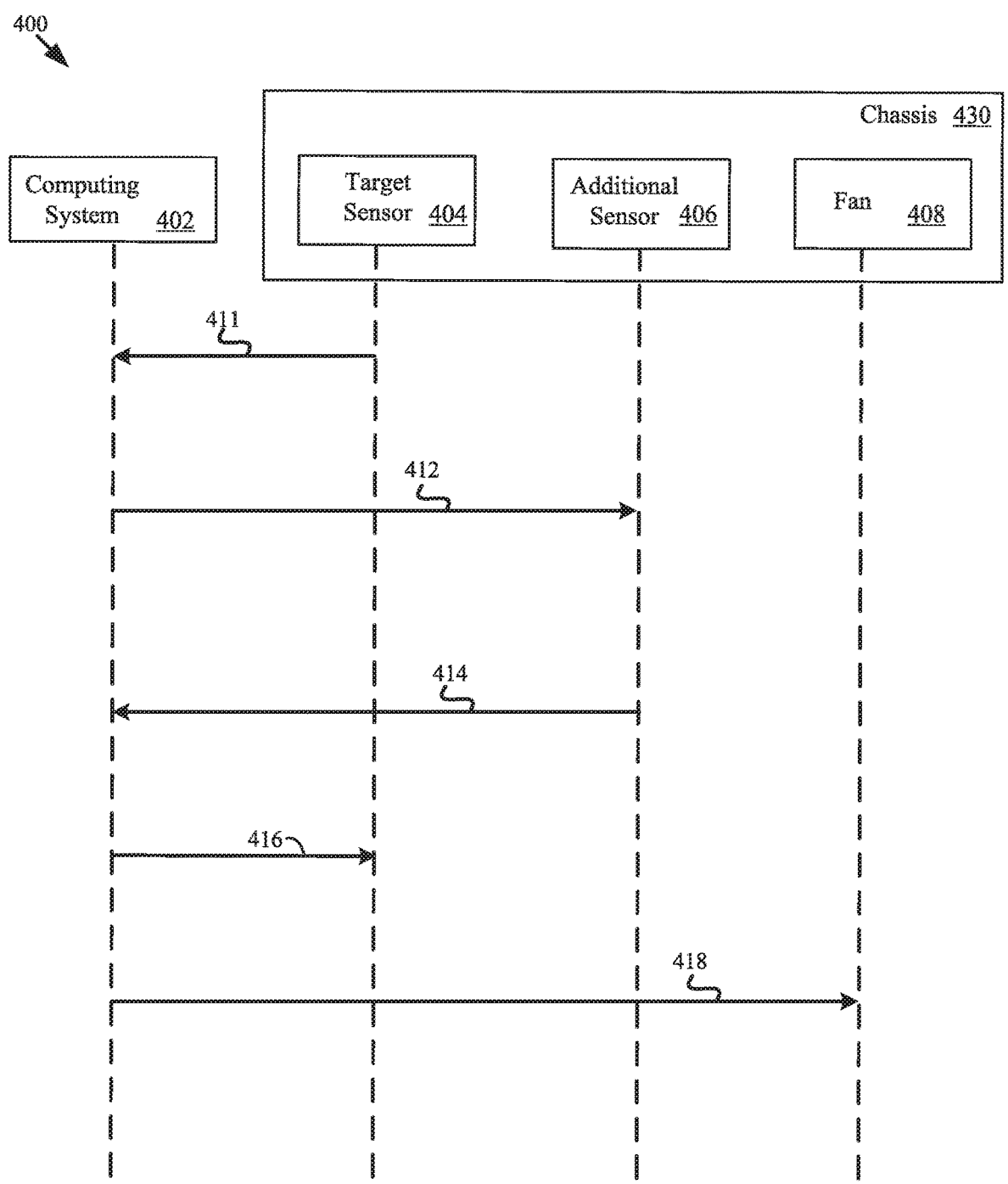
FIG. 4 illustrates a signal diagram illustrating a sequence of electronic communications between a computing system and sensors located in a chassis, according to one example.

FIG. 4 illustrates a signal diagram 400 illustrating a sequence of electronic communications between a computing system 402 and sensors located in a chassis 430, according to one example. The communications described with respect to the signal diagram 400 may be exchanged via one or more networks, system buses, or combinations thereof.

At arrow 411, the target sensor 404 reports a target sensor reading to the computing system 402. Upon determining that the target sensor reading satisfies a predefined condition, the computing system 402 queries the additional sensor 406 for an additional sensor reading at arrow 412. At arrow 414, the additional sensor 406 sends an additional sensor reading to the computing system 402 in response to the query that was sent at arrow 412.

Upon receiving the additional sensor reading from the additional sensor 406, the computing system 402 determines a trustworthiness value for the target sensor reading based on the additional sensor reading and based on an expected dependence relationship between sensor readings measured by the target sensor 404 and the additional sensor 406.

At arrow 416, upon determining that the trustworthiness value indicates that the target sensor reading is likely accurate, the computing system 402 sends a communication to the target sensor 404 instructing the target sensor 404 increase a rate at which the target sensor 404 collects sensor readings and/or a rate at which the target sensor 404 reports those sensor readings (e.g., in a manner described in related U.S. application Ser. No. 16/131,002). Also, at arrow 418, the computing system 402 signals the fan 408 to increase (or decrease, if appropriate) the speed at which the fan 408 is running.

Figure 5:
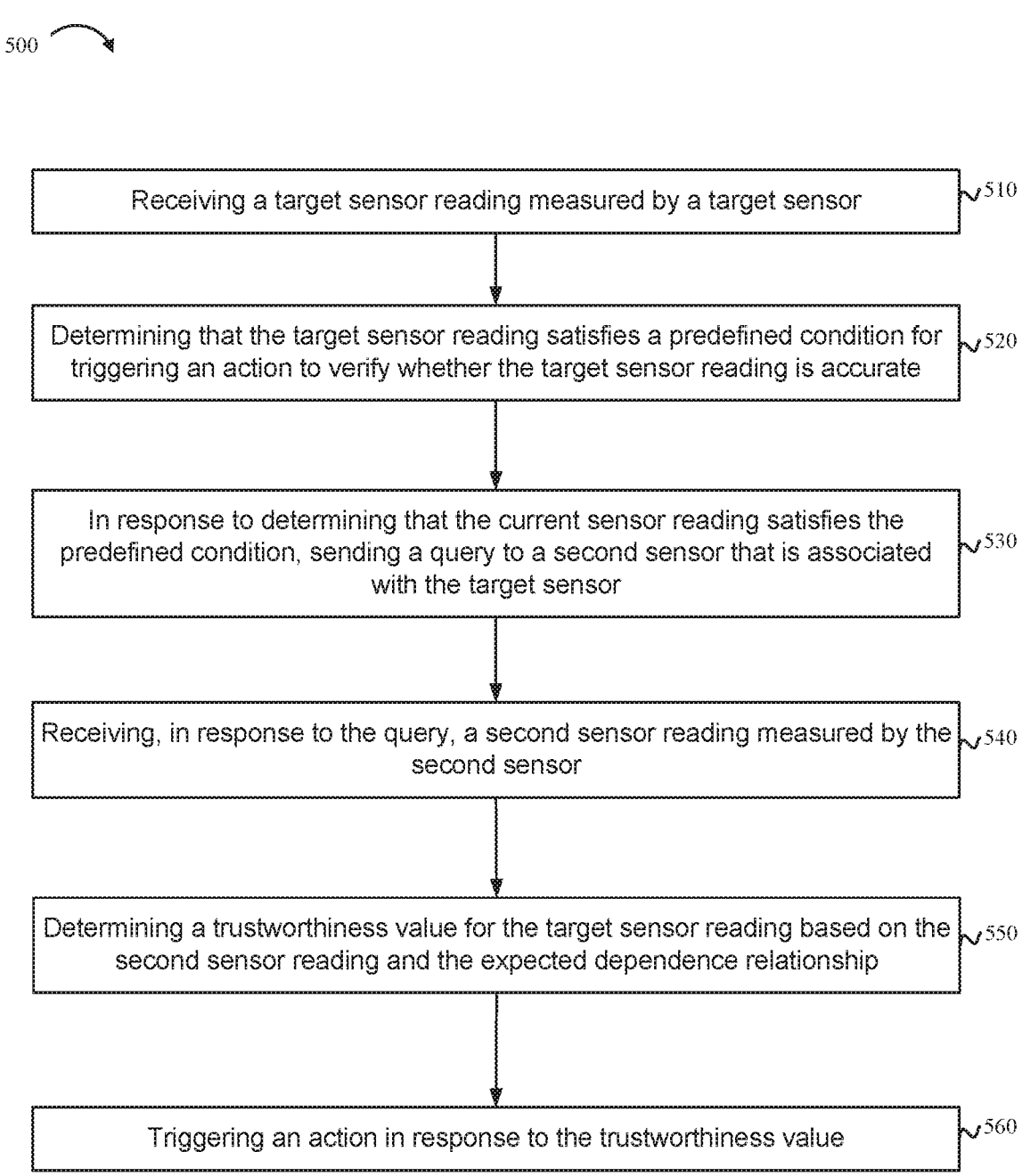
FIG. 5 illustrates functionality for a sensor-reading verifier as described herein, according to one example.

FIG. 5 illustrates functionality 500 for a sensor-reading verifier as described herein, according to one example. The functionality 500 may be implemented as a method or can be executed as instructions on a machine (e.g., by one or more processors), where the instructions are included on at least one computer-readable storage medium (e.g., a transitory or non-transitory computer-readable storage medium). While only six blocks are shown in the functionality 500, the functionality 500 may include other actions described herein. Also, some of the blocks shown in the functionality 500 may be omitted without departing from the spirit and scope of this disclosure.

As shown in block 510, the functionality 500 includes receiving a target sensor reading measured by a target sensor. In some examples, the functionality 400 may also include receiving a prior sensor reading measured by the target sensor before receiving the target sensor reading.

As shown in block 520, the functionality 500 includes determining that the target sensor reading satisfies a predefined condition for triggering an action to verify whether the target sensor reading is accurate.

In one example, determining that the target sensor reading satisfies the predefined condition may comprise determining a difference between the target sensor reading and a prior sensor reading previously measured by the target sensor by subtracting the prior sensor reading from the target sensor reading; and verifying that a magnitude of the difference between the target sensor reading and the prior sensor reading exceeds a predefined threshold.

As shown in block 530, the functionality 500 includes, in response to determining that the current sensor reading satisfies the predefined condition, sending a query to a second sensor that is associated with the target sensor. The association of the second sensor with the first sensor indicates an expected dependence relationship between sensor readings measured by the target sensor and sensor readings measured by the second sensor.

In one example, the expected dependence relationship exists because the second sensor is located within a predefined distance of the target sensor. In another example, the target sensor and the second sensor are temperature sensors; the target sensor is associated with a first SFP interface located in a chassis; and the second sensor is associated with a second SFP interface in the chassis, wherein the second SFP interface is adjacent to the first SFP interface.

As shown in block 540, the functionality 500 includes receiving, in response to the query, a second sensor reading measured by the second sensor.

As shown in block 550, the functionality 500 includes determining a trustworthiness value for the target sensor reading based on the second sensor reading and the expected dependence relationship. The trustworthiness value indicates a degree to which an observed relationship between the target sensor reading and the second sensor reading matches the expected dependence relationship.

As shown in block 560, the functionality 500 includes triggering an action in response to the trustworthiness value.

In one example, triggering the action in response to the trustworthiness value may comprises, in response to determining that the trustworthiness value indicates that the target sensor reading is inaccurate, transmitting a signal to the second sensor to increase a rate at which the second sensor collects sensor readings.

In another example, triggering the action in response to the trustworthiness value may comprise, in response to determining that the trustworthiness value indicates that the target sensor reading is inaccurate, adding an entry to an event log to reflect that the target reading is inaccurate; counting a number of entries in the event log that indicate inaccurate readings reported by the target sensor; and, upon determining that the number of entries meets a predefined threshold, transmitting a signal to the target sensor to deactivate the target sensor.

In another example, the target sensor and the second sensor are temperature sensors; the target sensor is associated with a first SFP interface located in a chassis; and the second sensor is associated with a second SFP interface in the chassis, wherein the second interface SFP is adjacent to the first SFP interface. In this example, triggering the action in response to the trustworthiness value may comprise, in response to determining that the trustworthiness value indicates that the target sensor reading is accurate, signaling a network switch contained in the chassis to reroute network traffic previously designated for a first optical transceiver plugged in to the first SFP interface.

While the present techniques may be susceptible to various modifications and alternative forms, the embodiments discussed above have been provided only as examples. It is to be understood that the techniques are not intended to be limited to the particular examples disclosed herein. Indeed, the present techniques include all alternatives, modifications, and equivalents falling within the true spirit and scope of the appended claims.

What is claimed is:

1. A system comprising:
one or more processors; and
a memory storing instructions that, when executed on the one or more processors, cause the one or more processors to:
receive a target sensor reading measured by a target sensor;
determine that the target sensor reading satisfies a predefined condition for triggering an action to verify whether the target sensor reading is accurate;
in response to determining that the current sensor reading satisfies the predefined condition, send a query to a second sensor that is associated with the target sensor, wherein the association of the second sensor with the target sensor indicates an expected dependence relationship between sensor readings measured by the target sensor and sensor readings measured by the second sensor;
receive, in response to the query, a second sensor reading measured by the second sensor;
determine a trustworthiness value for the target sensor reading based on the second sensor reading and the expected dependence relationship, wherein the trustworthiness value indicates a degree to which an observed relationship between the target sensor reading and the second sensor reading matches the expected dependence relationship; and
trigger an action in response to the trustworthiness value,
wherein, to trigger the action in response to the trustworthiness value, the instructions further cause the one or more processors to:
in response to determining that the trustworthiness value indicates that the target sensor reading is inaccurate, transmit a signal to the second sensor to increase a rate at which the second sensor collects sensor readings.

2. The system of claim 1, wherein, to determine that the target sensor reading satisfies the predefined condition, the instructions further cause the one or more processors to:
determine a difference between the target sensor reading and a prior sensor reading previously measured by the target sensor by subtracting the prior sensor reading from the target sensor reading; and
verify that a magnitude of the difference between the target sensor reading and the prior sensor reading exceeds a predefined threshold.

3. The system of claim 1, wherein, to trigger the action in response to the trustworthiness value, the instructions further cause the one or more processors to:
in response to determining that the trustworthiness value indicates that the target sensor reading is inaccurate, add an entry to an event log to reflect that the target reading is inaccurate;
count a number of entries in the event log that indicate inaccurate readings reported by the target sensor; and
upon determining that the number of entries meets a predefined threshold, transmit a signal to the target sensor to deactivate the target sensor.

4. The system of claim 1, wherein the second sensor is located within a predefined distance of the target sensor.

5. The system of claim 4, wherein:
the target sensor and the second sensor are temperature sensors;
the target sensor is associated with a first small form-factor pluggable (SFP) interface located in a chassis; and
the second sensor is associated with a second SFP interface in the chassis, wherein the second SFP interface is adjacent to the first SFP interface.

6. The system of claim 5, wherein, to trigger the action in response to the trustworthiness value, the instructions further cause the one or more processors to:
in response to determining that the trustworthiness value indicates that the target sensor reading is accurate, signal a network switch contained in the chassis to reroute network traffic previously designated for a first optical transceiver plugged in to the first SFP interface.

7. A method comprising:
receiving, by at least one processor, a target sensor reading measured by a target sensor;
determining that the target sensor reading satisfies a predefined condition for triggering an action to verify whether the target sensor reading is accurate;
in response to determining that the current sensor reading satisfies the predefined condition, sending a query to a second sensor that is associated with the target sensor, wherein the association of the second sensor with the target sensor indicates an expected dependence relationship between sensor readings measured by the target sensor and sensor readings measured by the second sensor;

receiving, in response to the query, a second sensor reading measured by the second sensor;

determining a trustworthiness value for the target sensor reading based on the second sensor reading and the expected dependence relationship, wherein the trustworthiness value indicates a degree to which an observed relationship between the target sensor reading and the second sensor reading matches the expected dependence relationship;

triggering, by the at least one processor, an action in response to the trustworthiness value; and in response to determining that the trustworthiness value indicates that the target sensor reading is inaccurate, as part of the action, transmitting a signal to the second sensor to increase a rate at which the second sensor collects sensor readings.

8. The method of claim 7, wherein determining that the target sensor reading satisfies the predefined condition comprises:

determining a difference between the target sensor reading and a prior sensor reading previously measured by the target sensor by subtracting the prior sensor reading from the target sensor reading; and verifying that a magnitude of the difference between the target sensor reading and the prior sensor reading exceeds a predefined threshold.

9. The method of claim 7, wherein triggering the action in response to the trustworthiness value comprises:

in response to determining that the trustworthiness value indicates that the target sensor reading is inaccurate, adding an entry to an event log to reflect that the target reading is inaccurate;

counting a number of entries in the event log that indicate inaccurate readings reported by the target sensor; and upon determining that the number of entries meets a predefined threshold, transmitting a signal to the target sensor to deactivate the target sensor.

10. The method of claim 7, wherein:

the second sensor is located within a predefined distance of the target sensor.

11. The method of claim 10, wherein:

the target sensor and the second sensor are temperature sensors;

the target sensor is associated with a first small form-factor pluggable (SFP) interface located in a chassis; and the second sensor is associated with a second SFP interface in the chassis, wherein the second SFP interface is adjacent to the first SFP interface.

12. The method of claim 11, further comprising triggering another action in response to the trustworthiness value, comprising:

in response to determining that the trustworthiness value indicates that the target sensor reading is accurate, signaling a network switch contained in the chassis to reroute network traffic previously designated for a first optical transceiver plugged in to the first SFP interface.

13. A non-transitory computer-readable storage medium containing instructions thereon that, when executed on a processor, cause the processor to:

receive a target sensor reading measured by a target sensor;

determine that the target sensor reading satisfies a predefined condition for triggering an action to verify whether the target sensor reading is accurate;

in response to determining that the current sensor reading satisfies the predefined condition, send a query to a second sensor that is associated with the target sensor, wherein the association of the second sensor with the target sensor indicates an expected dependence relationship between sensor readings measured by the target sensor and sensor readings measured by the second sensor;

receive, in response to the query, a second sensor reading measured by the second sensor;

determine a trustworthiness value for the target sensor reading based on the second sensor reading and the expected dependence relationship, wherein the trustworthiness value indicates a degree to which an observed relationship between the target sensor reading and the second sensor reading matches the expected dependence relationship; and trigger an action in response to the trustworthiness value comprising:

in response to determining that the trustworthiness value indicates that the target sensor reading is inaccurate, transmit a signal to the second sensor to increase a rate at which the second sensor collects sensor readings.

14. The non-transitory computer-readable storage medium of claim 13, wherein, to determine that the target sensor reading satisfies the predefined condition, the instructions further cause the processor to:

determine a difference between the target sensor reading and a prior sensor reading previously measured by the target sensor by subtracting the prior sensor reading from the target sensor reading; and verify that a magnitude of the difference between the target sensor reading and the prior sensor reading exceeds a predefined threshold.

15. The non-transitory computer-readable storage medium of claim 13, wherein, to trigger the action in response to the trustworthiness value, the instructions further cause the processor to:

in response to determining that the trustworthiness value indicates that the target sensor reading is inaccurate, add an entry to an event log to reflect that the target reading is inaccurate;

count a number of entries in the event log that indicate inaccurate readings reported by the target sensor; and upon determining that the number of entries meets a predefined threshold, transmit a signal to the target sensor to deactivate the target sensor.

16. The non-transitory computer-readable storage medium of claim 13, wherein:

the target sensor and the second sensor are temperature sensors;

the target sensor is associated with a first small form-factor pluggable (SFP) interface located in a chassis; and the second sensor is associated with a second SFP interface in the chassis, wherein the second SFP interface is adjacent to the first SFP interface.

17. The non-transitory computer-readable storage medium of claim 16, wherein, to trigger the action in response to the trustworthiness value, the instructions further cause the processor to:

in response to determining that the trustworthiness value indicates that the target sensor reading is accurate, signal a network switch contained in the chassis to reroute network traffic previously designated for a first optical transceiver plugged in to the first SFP interface.

18. A method comprising:

receiving, by at least one processor, a target sensor reading measured by a target sensor;

determining that the target sensor reading satisfies a predefined condition for triggering an action to verify whether the target sensor reading is accurate;
in response to determining that the current sensor reading satisfies the predefined condition, sending a query to a second sensor that is associated with the target sensor, wherein the association of the second sensor with the target sensor indicates an expected dependence relationship between sensor readings measured by the target sensor and sensor readings measured by the second sensor;
receiving, in response to the query, a second sensor reading measured by the second sensor;
determining a trustworthiness value for the target sensor reading based on the second sensor reading and the expected dependence relationship, wherein the trustworthiness value indicates a degree to which an observed relationship between the target sensor reading and the second sensor reading matches the expected dependence relationship;
triggering, by the at least one processor, an action in response to the trustworthiness value including:
in response to determining that the trustworthiness value indicates that the target sensor reading is inaccurate, adding an entry to an event log to reflect that the target reading is inaccurate;
counting a number of entries in the event log that indicate inaccurate readings reported by the target sensor; and
upon determining that the number of entries meets a predefined threshold, transmitting a signal to the target sensor to deactivate the target sensor.

19. A method comprising:
receiving, by at least one processor, a target sensor reading measured by a target sensor;
determining that the target sensor reading satisfies a predefined condition for triggering an action to verify whether the target sensor reading is accurate;
in response to determining that the current sensor reading satisfies the predefined condition, sending a query to a second sensor that is associated with the target sensor, wherein the association of the second sensor with the target sensor indicates an expected dependence relationship between sensor readings measured by the target sensor and sensor readings measured by the second sensor;
receiving, in response to the query, a second sensor reading measured by the second sensor;
determining a trustworthiness value for the target sensor reading based on the second sensor reading and the expected dependence relationship, wherein the trustworthiness value indicates a degree to which an observed relationship between the target sensor reading and the second sensor reading matches the expected dependence relationship;
wherein the second sensor is located within a predefined distance of the target sensor,
wherein the target sensor and the second sensor are temperature sensors,
wherein the target sensor is associated with a first small form-factor pluggable (SFP) interface located in a chassis,
wherein the second sensor is associated with a second SFP interface in the chassis, and
wherein the second SFP interface is adjacent to the first SFP interface; and
triggering, by the at least one processor, an action in response to the trustworthiness value including, in response to determining that the trustworthiness value indicates that the target sensor reading is accurate, signaling a network switch contained in the chassis to reroute network traffic previously designated for a first optical transceiver plugged in to the first SFP interface.

\* \* \* \* \*